US012601459B2

(12) United States Patent
Nykerk

(10) Patent No.: US 12,601,459 B2
(45) Date of Patent: Apr. 14, 2026

(54) LIGHT ASSEMBLY FOR DRL AND TURN FUNCTIONS

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 19/013,777

(22) Filed: Jan. 8, 2025

(65) Prior Publication Data

US 2025/0230914 A1 Jul. 17, 2025

Related U.S. Application Data

(60) Provisional application No. 63/620,765, filed on Jan. 12, 2024.

(51) Int. Cl.

*F21S 43/14* (2018.01)
*F21S 43/20* (2018.01)
*F21S 43/237* (2018.01)
*F21Y 113/10* (2016.01)
*F21Y 115/10* (2016.01)

(Continued)

(52) U.S. Cl.

CPC ............. *F21S 43/14* (2018.01); *F21S 43/237* (2018.01); *F21S 43/2621* (2024.05); *F21W 2103/20* (2018.01); *F21W 2103/55* (2018.01); *F21Y 2113/10* (2016.08); *F21Y 2115/10* (2016.08)

(58) Field of Classification Search

CPC ......................... B60Q 2400/20; B60Q 1/0041; B60Q 1/0047; B60Q 1/2696; B60Q 2400/30; B60Q 1/2607; F21S 43/14; F21S 43/237; F21S 43/20; F21Y 113/10; F21Y 115/10

See application file for complete search history.

(56) References Cited

U.S. PATENT DOCUMENTS 6,842,111 B1 1/2005 Smithson
7,086,765 B2 8/2006 Wehner
7,341,365 B2 3/2008 Basile et al.

(Continued)

FOREIGN PATENT DOCUMENTS

CN 115127080 A 9/2022
DE 102016118717 A1 4/2018

(Continued)

OTHER PUBLICATIONS

Extended European Search Report issued Apr. 7, 2025 in EP application No. 25151220.8, 18 pages.

*Primary Examiner* — William J Carter
(74) *Attorney, Agent, or Firm* — Avek IP, LLC

(57) ABSTRACT

A light source comprises an array of both white and amber LEDs. One or more light pipes are disposed adjacent the array of LEDs. An optical sheet is disposed adjacent the light pipe(s) wherein light modifying elements of the optical sheet are aligned perpendicular to the array of LEDs. During DRL activation, both white and amber LEDs illuminate, altering the output from a bluish-white to a warmer tone by integrating the amber LEDs with the white ones. The turn signal function exclusively illuminates the amber LEDs. This design significantly reduces the necessary number of white LEDs for a compliant DRL function while ensuring efficiency and an aesthetically pleasing lighting assembly in a compact space.

11 Claims, 4 Drawing Sheets

(51) Int. Cl.

| | |
|---|---|
| *F21W 103/20* | (2018.01) |
| *F21W 103/55* | (2018.01) |

(56) References Cited

U.S. PATENT DOCUMENTS

| | | | | |
|---|---|---|---|---|
| 8,398,284 | B1 | 3/2013 | Dvorzsak | |
| 9,772,085 | B2 | 9/2017 | Dubosc | |
| 10,443,790 | B2 | 10/2019 | George et al. | |
| 11,518,298 | B2 | 12/2022 | Cobb et al. | |
| 2008/0092800 | A1 | 4/2008 | Smith et al. | |
| 2009/0051506 | A1 | 2/2009 | Hicksted et al. | |
| 2016/0116666 | A1* | 4/2016 | Sato | F21S 43/26261 362/509 |
| 2018/0274745 | A1* | 9/2018 | Nykerk | F21V 5/007 |
| 2020/0254920 | A1 | 8/2020 | Kessels et al. | |
| 2021/0372592 | A1* | 12/2021 | Nykerk | F21S 41/143 |

FOREIGN PATENT DOCUMENTS

| | | | |
|---|---|---|---|
| DE | 102017115899 | A1 | 1/2019 |
| FR | 3019117 | A1 | 10/2015 |

* cited by examiner

LIGHT ASSEMBLY FOR DRL AND TURN FUNCTIONS

CROSS-REFERENCE TO RELATED APPLICATIONS

This application claims the benefit of U.S. Provisional Patent Application No. 63/620,765, filed Jan. 12, 2024, the entire contents thereof are herein incorporated by reference.

BACKGROUND OF THE INVENTION

1. Field

Embodiments of this disclosure relate generally to light assemblies for vehicle lamps. More specifically, embodiments of this disclosure include light assemblies configured to provide both Daytime Running Light (DRL) and Turn signal functions.

2. Description of the Related Art

Many different types of vehicle lighting assemblies having a light pipe have been described in the prior art. For example, U.S. Pat. No. 10,443,790 to George et al. discloses a light pipe assembly with a light emitting diode (LED) light source at one end. The pipe has a surface with an emitting portion and an overlay portion, along with a reflective secondary surface. U.S. Pat. No. 9,772,085 to Dubosc discloses an optical light emission system for vehicles comprised of two lighting subsystems with a light guide for mixing and homogenizing the two light sources. U.S. Pat. No. 7,341,365 to Basile et al. discloses an LED unit for a vehicle lamp assembly having a housing, LEDs, a light pipe, and an optic structure. The optic structure is used to scatter light in a series of directions distal to the housing. U.S. Pat. No. 7,086,765 to Wehner discloses an LED lamp assembly with an array of LEDs that emit light onto a reflector, and the reflector reflects the light into a light beam. A light pipe is positioned in front of the reflector and receives light from a separate LED at its end.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a light assembly for vehicular lighting, the light assembly including: a first plurality of LEDs of a first color; a second plurality of LEDs of a second color, wherein the first LEDs and the second LEDs are arranged together in an array; at least one light pipe disposed adjacent to the plurality of LEDs; an optical sheet disposed adjacent the at least one light pipe, wherein the optical sheet includes a plurality of light modifying elements aligned perpendicular to the array; and a controller operatively coupled to the first LEDs and the second LEDs, wherein the controller is configured to perform: a first illumination function by illuminating only the first LEDs; and a second illumination function by illuminating both the first LEDs and the second LEDs.

In some embodiments, the techniques described herein relate to a light assembly wherein the light modifying elements include a lenticular sheet wherein one side of the lenticular sheet has at least one lens and an opposite side of the lenticular sheet is substantially flat.

In some embodiments, the techniques described herein relate to a light assembly wherein a plurality of lenticular sheets are layered to modify light from the first and second pluralities of LEDs.

In some embodiments, the techniques described herein relate to a light assembly wherein the light modifying elements are configured for diffusing light along a longitudinal direction of the light pipe for smoothing light from the first LEDs and the second LEDs.

In some embodiments, the techniques described herein relate to a light assembly wherein the array is a linear array and the first LEDs and the second LEDs alternate along the length of the linear array.

In some embodiments, the techniques described herein relate to a light assembly wherein the array is a multi-linear matrix and the first LEDs and the second LEDs alternate along the length of the multi-linear matrix.

In some embodiments, the techniques described herein relate to a light assembly wherein the first LEDs and the second LEDs are arranged in an alternating pattern with up to four of the LEDs of the first or second color being directly adjacent to one another.

In some embodiments, the techniques described herein relate to a light assembly wherein the alternating pattern is repeated along the length of the multi-linear matrix.

In some embodiments, the techniques described herein relate to a light assembly wherein the first LEDs are white colored LEDs, and the second LEDs are amber colored LEDs.

In some embodiments, the techniques described herein relate to a light assembly wherein the first function corresponds to a daytime running light function, and the second function corresponds to a turn indicator function.

In some embodiments, the techniques described herein relate to a light assembly wherein a curvilinear light pipe aligns with a curvilinear array of LEDs.

In some embodiments, the techniques described herein relate to a vehicular lighting method, the method including: illuminating a plurality of first color LEDs via a controller; illuminating the first color LEDs and a plurality of second color LEDs via the controller; modifying light emitted from the first color LEDs and the second color LEDs via at least one light pipe disposed adjacent to the first and second color LEDs; and diffusing light emitted from the at least one light pipe via an optical sheet disposed adjacent to the at least one light pipe, wherein light modifying elements of the optical sheet are aligned perpendicular to the plurality of LEDs.

In some embodiments, the techniques described herein relate to a method including diffusing light via the light modifying elements along a longitudinal direction of the light pipe thereby smoothing light from the first color LEDs and the second color LEDs.

In some embodiments, the techniques described herein relate to a method including blending light from the first color LEDs with the second color LEDs to produce sufficient light output while performing a daytime running light function.

In some embodiments, the techniques described herein relate to a method including blending light from only the second color LEDs, while the first color LEDs are turned off, to produce sufficient light output while performing an automotive signaling function.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
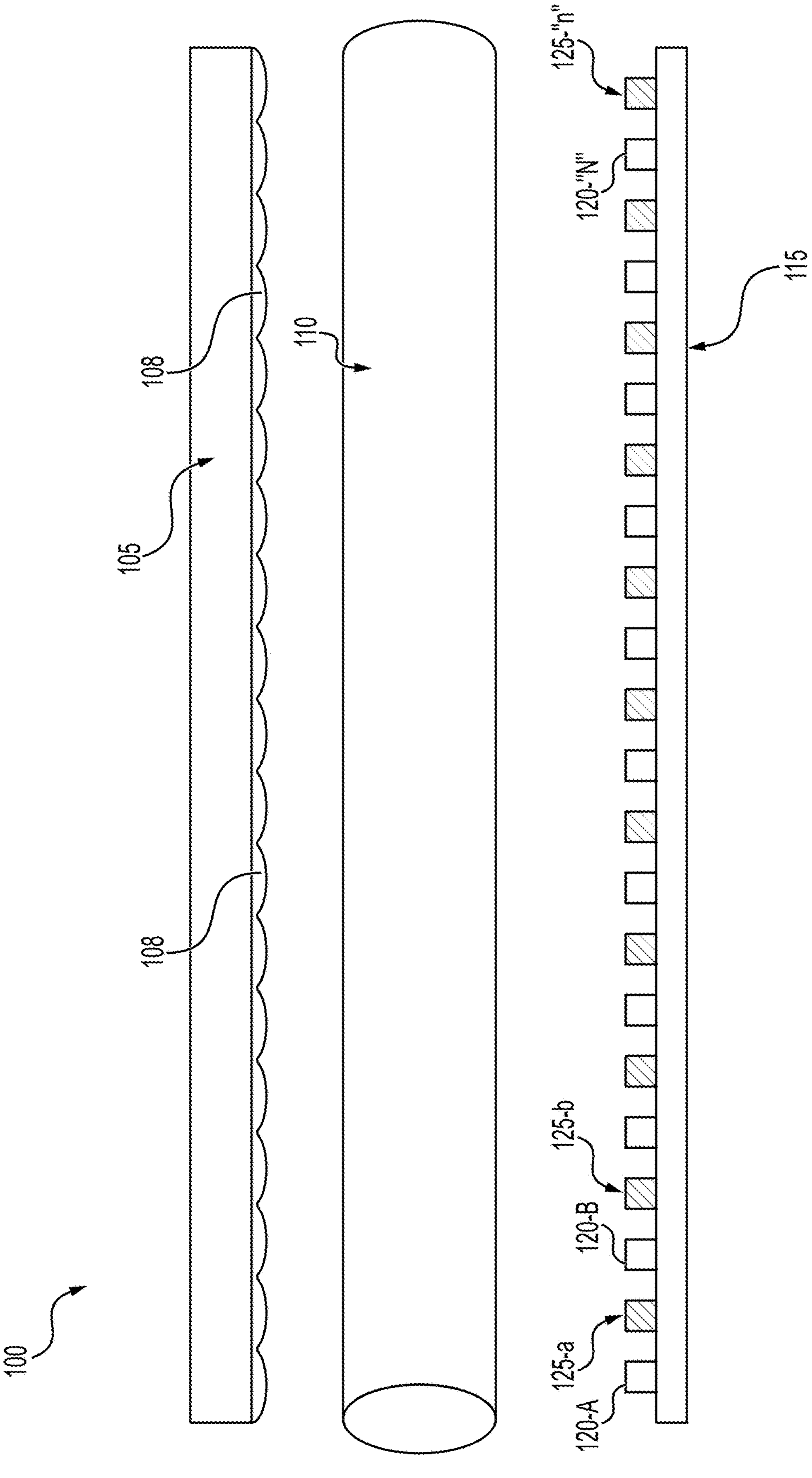
FIG. 1 shows a schematic of a light assembly according to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

FIG. 1 is a cross-sectional side view of an exemplary lighting assembly 100. Lighting assembly 100 may be integrated with a vehicle lamp assembly, including but not limited to headlight and taillight assemblies, daytime running lights (DRLs), center high-mounted stop lamps, multi-function light assemblies, fog lamps, and turn signals. An array of light sources comprises a plurality of first light sources 120-A-120-"N" (denoted herein as 120-*x*), for example an array of LEDs of a first color (e.g. white LEDs) mounted on a printed circuit board (PCB) 115. The array of light sources further comprises a plurality of second light sources 125-*a*-125-"n" (denoted herein as 125-*x*), for example an array of LEDs of a second color (e.g. amber LEDs) mounted on PCB 115. In some embodiments, first light source 120-*x* and second light source 125-*x* alternate along the array of LEDs. For brevity, the current discussion uses white and amber LEDs as examples. At least one light pipe is disposed immediately adjacent the array of LEDs. In some embodiments, multiple light pipes are located immediately adjacent to the array of LEDs. In this disclosure, the term "immediately adjacent" means that two objects are right next to one another without another structure in between; the two objects may or may not be touching each other, but any gap therebetween is small. In some embodiments, the light pipe is disposed at least 0.25 mm from the array of LEDs. An optical sheet 105 is disposed a predetermined distance from the light pipe 110 with the light modifying elements of the optical sheet running perpendicular to the array of LEDs.

In various lighting applications, optical sheets may be used to affect light emitted from a light source. The optical sheets are for example optically clear plastic sheets having an array of light modifying elements 108 (e.g., lenticular lenses) on one side, with the opposite side being flat. The array of light modifying elements 108 may be imprinted or molded on the sheet in a pattern. Depending on the size, shape, and focal length of the individual light modifying elements, as well as their collective pattern on the sheet, the optical sheets may be used to shape light from a light source in various ways. For example, light may be shifted, magnified, smoothed, homogenized, etc. To provide different lighting effects, multiple lenticular sheets may be layered on top of one another. The multiple sheets may be layered with varying orientations of lenticular patterns to scatter light in numerous directions. Different optical sheets and their uses are described in U.S. Pat. No. 11,002,987 to Nykerk et al., U.S. Pat. No. 10,753,579 to Nykerk et al., and U.S. Pat. No. 11,624,492 to Nykerk et al. which are each hereby incorporated by reference in their entirety for all purposes.

In the embodiments depicted in FIG. 1, lighting assembly 100 may include at least one or more light pipes without departing from the scope hereof. An exemplary light pipe and its uses are described in U.S. Pat. No. 11,506,359 to Nykerk et al. which is hereby incorporated by reference in its entirety for all purposes. The plurality of first light sources 120-*x* and plurality of second light sources 125-*x* are configured for transmitting light to pass through each of the light pipe(s) at an oblique angle between the vertical and transverse axes of the light pipe(s). In other words, light emitted from the plurality of first light sources 120-*x* and plurality of second light sources 125-*x* travels through the light pipe substantially along a diameter of the light pipe, and the light exits and enters opposing sides of the light pipe depending on the angle at which the light enters. The arrangement of light pipe(s) oriented vertically above the plurality of first light sources 120-*x* and plurality of second light sources 125-*x*, as depicted in FIG. 1, contrasts with a typical light pipe arrangement where a light source projects light into an end of a light pipe for propagating light lengthwise along a longitudinal direction of the light pipe, e.g., via total-internal reflection (TIR). By employing a line of light sources lengthwise along each of light pipe(s), a pattern of light may be projected along the length of each light pipe.

Figure 2A:
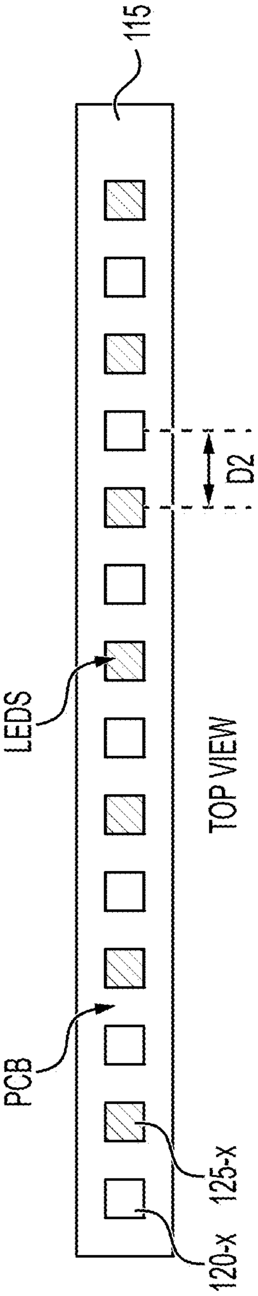
FIGS. 2A and 2B show schematics of a light assembly according to some embodiments.

FIG. 2A is a top-down view of PCB 115 having the plurality of first light sources 120-*x* and plurality of second light sources 125-*x* mounted thereto in a single linear array. Not all light sources are labeled in FIG. 2A for clarity of illustration. The plurality of first light sources 120-*x* and plurality of second light sources 125-*x* are configured to provide an array of light sources (e.g., a linear array of LEDs) aligned along a longitudinal direction and arranged in a linear pattern. The plurality of first light sources 120-*x* and plurality of second light sources 125-*x* are mounted on PCB 115 and intermittently spaced a predetermined distance apart from one another, such as the distance labeled "D2" in FIG. 2A. In some embodiments, the plurality of first light sources 120-*x* and plurality of second light sources 125-*x* are arranged equidistant from one another on PCB 115 (i.e., each of the light sources is a distance D2 apart from one another). In other embodiments, distances between the plurality of first light sources 120-*x* and plurality of second light sources 125-*x* may be non-uniform.

Figure 2B:
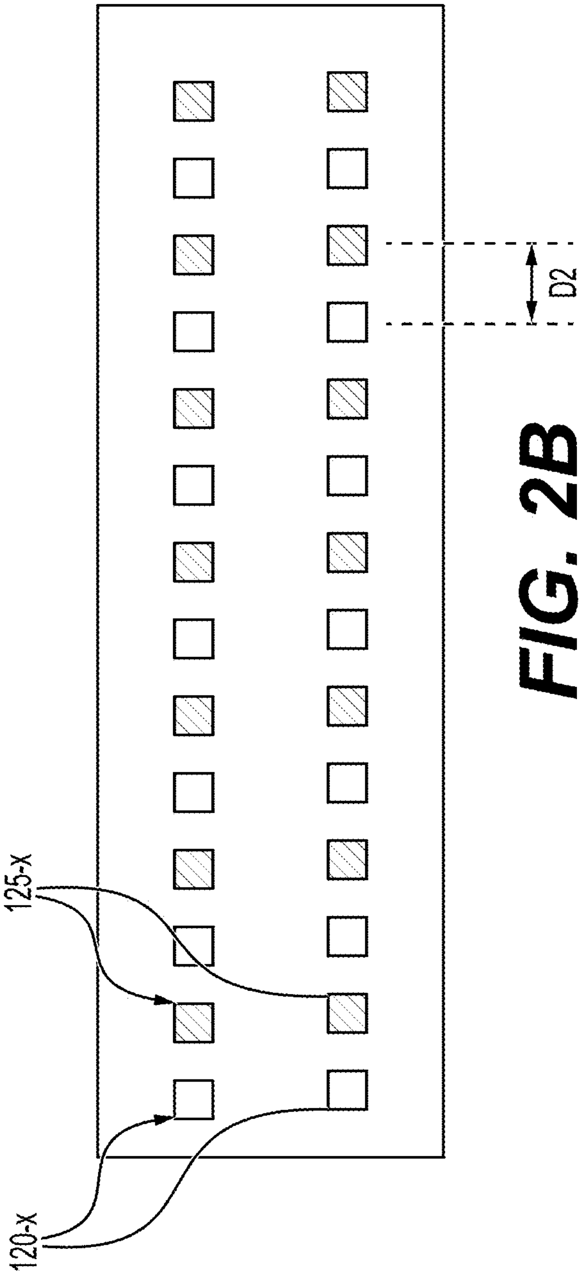

FIG. 2B is a top-down view of PCB 115 having the plurality of first light sources 120-*x* and plurality of second light sources 125-*x* mounted thereto in a multi-linear matrix. FIG. 2B illustrates two linear arrays. However, the matrix may comprise any number of linear arrays and still fall within the scope of the claimed subject matter. Not all light sources are labeled in FIG. 2B for clarity of illustration. The plurality of first light sources 120-*x* and plurality of second light sources 125-*x* are configured to provide an array of light sources (e.g., a multi-linear matrix of LEDs) aligned along a longitudinal direction and arranged in a multi-linear matrix pattern. The plurality of first light sources 120-*x* and plurality of second light sources 125-*x* are mounted on PCB 115 and intermittently spaced a predetermined distance apart from one another, such as the distance labeled "D2" in FIG. 2B. In some embodiments, the plurality of first light sources 120-*x* and plurality of second light sources 125-*x* are arranged equidistant from one another on PCB 115 (i.e., each of the light sources is a distance D2 apart from one another). In other embodiments, distances between the plurality of first light sources 120-*x* and plurality of second light sources 125-*x* may be non-uniform. In FIG. 2B, the plurality of first light sources 120-*x* and plurality of second light sources 125-*x* are illustrated as being similarly aligned in the first linear array and the second linear array. However, the various linear arrays may alternate (e.g. the second linear array may start with a second light source 125-*x*) and still fall within the scope of the claimed subject matter.

FIGS. 1, 2A, and 2B illustrate the plurality of first light sources 120-*x* and plurality of second light sources 125-*x* arranged in an alternating manner. However, the colors (e.g. white and amber) may be arranged with the same color next to one another up to a maximum number of four LEDs of the same color next to one another. Table 1 illustrates examples of possible repeating unit arrangements along the length of the linear array. Each repeating unit can be duplicated along the entire length of the LED array. There may be other configurations that are possible and will still fall within the scope of the claimed subject matter. In Table 1 the white LEDs are denoted by a "W" and the amber LEDs are denoted by a "A". As discussed with respect to FIG. 2B, different linear arrays of the matrix may have different LED arrangements.

TABLE 1

| | | | |
|---|---|---|---|
| W A | | | |
| WW AA | WW A | | |
| WWW AAA | WWW AA | WWW A | |
| WWWW AAAA | WWWW AAA | WWWW AA | WWWW A |
| A W | | | |
| AA WW | AA W | | |
| AAA WWW | AAA WW | AAA W | |
| AAAA WWWW | AAAA WWW | AAAA WW | AAAA W |

Each of the individual LEDs of the plurality of first light sources 120-*x* and plurality of second light sources 125-*x* may be independently lit and unlit via a controller (e.g., see below description of controller 450 in connection with FIG. 4) that is electrically and communicatively coupled with PCB 115. First light sources 120-*x* may be all of one type (e.g., sizes, colors, and/or intensities). Second light sources 125-*x* may be all of one type (e.g., sizes, colors, and/or intensities). In some embodiments, the plurality of first light sources 120-*x* and plurality of second light sources 125-*x* have a cone angle that is about 120-degrees wide. In other embodiments, the plurality of first light sources 120-*x* and plurality of second light sources 125-*x* have a cone angle that is about 60-degrees wide or about 30-degrees wide. Smaller cone angles provide increased intensity compared to larger cone angles but reduce the area that is effectively lit.

The light pipe(s) also contribute to smoothing the lit image. For example, the light pipe(s) radially focuses the light emitted by plurality of first light sources 120-*x* and plurality of second light sources 125-*x*, thereby collecting the emitted light and optically stabilizing the lit image, such that the lit image is visually consistent from various viewing angles.

Figure 3:
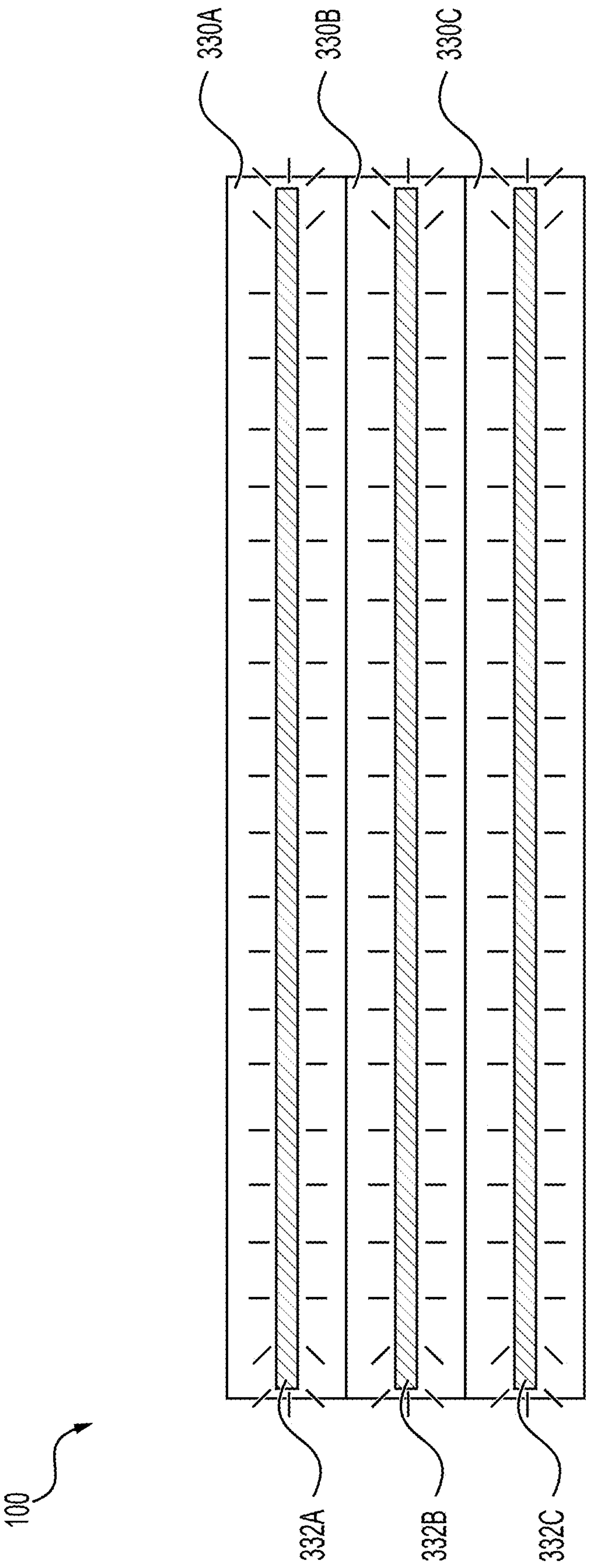
FIG. 3 shows a schematic of a light assembly according to some embodiments.

FIG. 3 is a top-down view of first, second, and third light pipes 330A, 330B, 330C. FIG. 3 illustrates three light pipes and three linear arrays. As discussed above, the light assembly may comprise one light pipe up to a plurality of light pipes for each linear array and still fall within the claimed subject matter. The light pipes 330A-330C are for example elongated optical members, such as cylindrical rods made of an optically clear plastic, e.g., polycarbonate (PC) or poly (methyl methacrylate) (PMMA). Each of the light pipes 330A-330C is arranged side-by-side adjacent to one another and disposed directly on top of the linear arrays of light sources (see e.g., FIG. 1). The various components described above are arranged for producing a lit line image along each of the light pipes 330A-330C, indicated in FIG. 3 as a first lit line image 332A, a second lit line image 332B, and a third lit line image 332C. Each lit line image 332A-C is configured to appear as an individual homogenous line of light that is easily distinguishable from a neighboring lit line image.

Returning to FIG. 1, depending on the size, intensity, and cone angle of each of the plurality of first light sources 120-*x* and plurality of second light sources 125-*x*, and their distance D2 apart from one another, a desired pattern of lit line images 332A-332C is produced. In certain embodiments, line-image lighting assembly 100 uses only one linear array of the plurality of first light sources 120-*x* and plurality of second light sources 125-*x*, to provide a plurality of lit line images 332A-332C each having a uniform and high-intensity light output, while a plurality of lit line images are provided via a corresponding number of light pipes.

Although FIGS. 1, 2A-2B, and 3 depict a straight line lighting assembly 100, all of the components of lighting assembly 100 (e.g., PCB 115, light pipe 110, and optical sheet 105) may be curved lengthwise along a matching curvilinear path to form a curvilinear lighting assembly.

Figure 4:
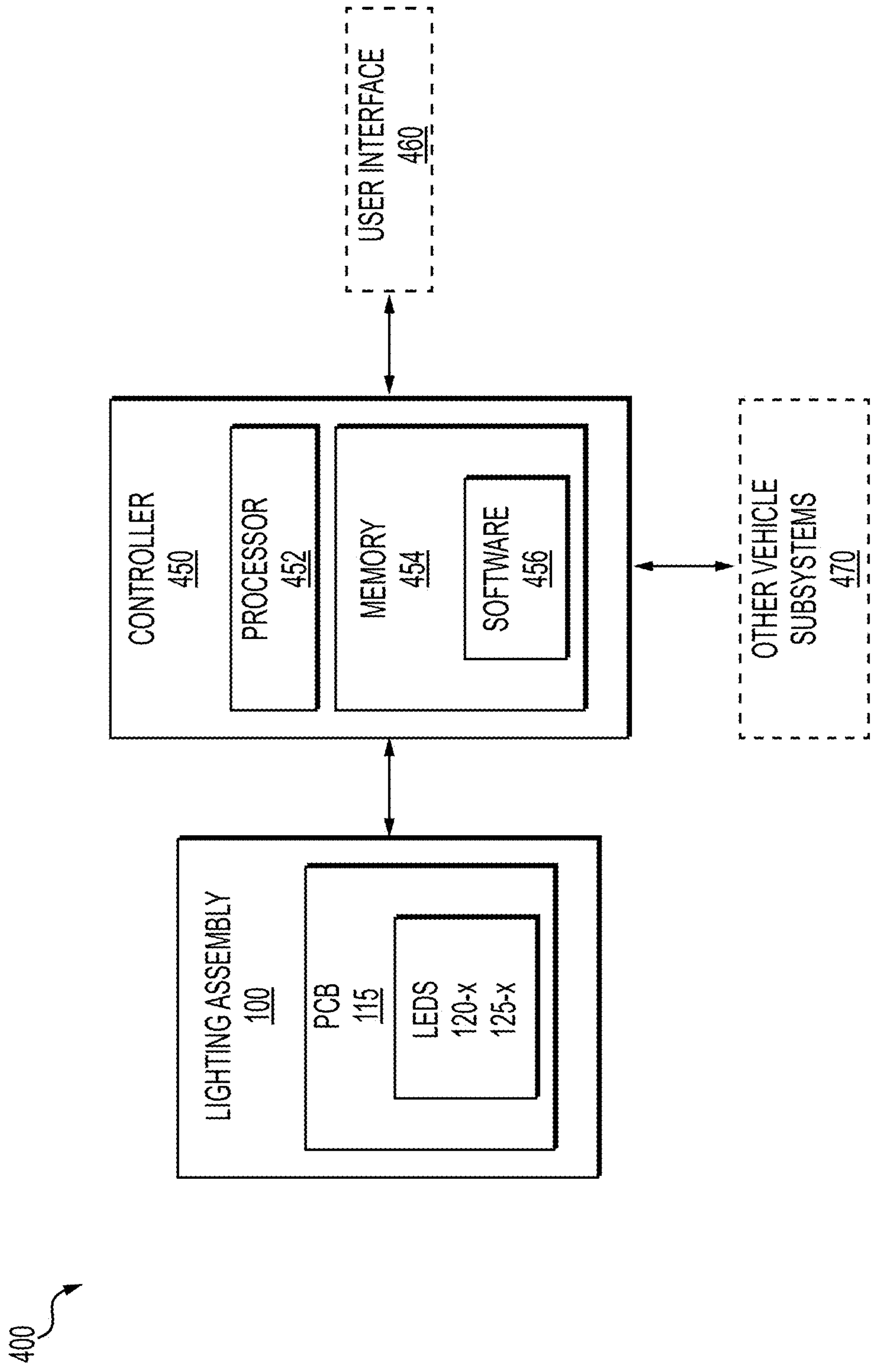
FIG. 4 shows a schematic of a light assembly control scheme according to some embodiments.

FIG. 4 is a block diagram showing components of an exemplary control system 400 for controlling line-image lighting assembly 100. Control system 400 includes a controller 450, which is for example a computer, microcontroller, microprocessor, or programmable logic controller (PLC) having a memory 454, including a non-transitory medium for storing software 456, and a processor 452 for executing instructions of software 456. An optional user interface 460 enables a user to transmit instructions and receive information, as further described below. The controller 450 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 460 includes a user input device, which may include one or more buttons or switches located in a vehicle cabin or on a handheld device (e.g., a key fob) for controlling the lighting assembly 100. In some embodiments, user interface 460 includes a touch screen display device configured for receiving touch indications by the user. The touch screen display device may be located in the vehicle cabin and/or accessed remotely via a mobile device (e.g., smartphone, tablet, or laptop computer). User interface 460 may be configured to present a menu for selecting various patterns via the plurality of light sources employed in lighting assembly 100.

Control system 400 of FIG. 4 enables lighting assembly 100 to provide custom appearances (e.g., stylistic features or lighting), which are optionally integrated within automotive lamp assemblies including but not limited to headlight and taillight assemblies, daytime-running lights (DRLs), center high-mounted stop lamps, multi-function light assemblies, fog lamps, and turn signals. In certain embodiments, controller 450 is optionally coupled communicatively with other vehicle subsystems 470. For example, controller 450 may be programmed with instructions for controlling one or more plurality of first light sources 120-*x* and plurality of second light sources 125-*x* in coordination with other vehicle subsystems 470. This enables automatic control of the lighting assembly 100 based on input signals provided by other subsystems of the vehicle. For example, when a user locks or unlocks the vehicle doors via a key fob, lighting assembly 100 may illuminate. For a vehicle taillight having lighting assembly 100 integrated therein, the plurality of first light sources 120-*x* and plurality of second light sources 125-*x* may be illuminated based on a stop signal from a braking subsystem, or the light sources may be controlled to blink in coordination with a turn signal.

Communication between user interface 460, controller 450, other vehicle subsystems 470, and the lighting assembly 100 may be by a wired and/or wireless communication media. For example, controller 450 may include a transmitter/receiver, a multi-channel input/output (I/O) data bus, or the like (not shown) for communicatively coupling with user interface 460 and PCB 115 of lighting assembly 100. The controller 450 is programmed with instructions for sending signals to the PCB 115 for switching light sources on/off or for dimming the light sources via for example pulse-width modulation (PWM). Other electronics known to those of skill in the art may be used in conjunction with the controller 450 for controlling light sources and providing PWM without departing from the scope hereof. The programmed instructions may be predetermined and/or responsive to inputs from the user interface 460 or other vehicle subsystems 470. For example, programmed instructions may be used to dynamically illuminate plurality of first light sources 120-*x* and plurality of second light sources 125-*x* in a variety of predetermined or random patterns, which may be configured for producing custom or variable stylistic or decorative features on the exterior of a vehicle, including lighting effects having different colors (e.g., via control of differently colored LEDs) and animated lighting effects.

One example of the use of the controller to dynamically illuminate the plurality of first light sources 120-*x* and plurality of second light sources 125-*x* is described below. When the desired function is a "turn", only the plurality of second light sources 125-*x* (e.g. the amber LEDs) is activated and the plurality of first light sources 120-*x* (e.g. white LEDs) is turned off. When the desired function is a "DRL function", both the plurality of first light sources 120-*x* (e.g. white LEDs) and the plurality of second light sources 125-*x* (e.g. the amber LEDs) are activated. When both the plurality of first light sources 120-*x* (e.g. white LEDs) and the plurality of second light sources 125-*x* (e.g. the amber LEDs) are activated, the output light shifts from a blueish white (e.g. only white LEDs activated) to warmer white caused by the influence of the amber LEDs. As discussed previously, other colors of LEDs may be incorporated to further modify the color of the output light as desired by preference or regulations.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A light assembly for vehicular lighting, the light assembly comprising:

a first plurality of LEDs of a first color;

a second plurality of LEDs of a second color, wherein the first LEDs and the second LEDs are arranged together in a linear array, and the first LEDs and the second LEDs alternate along a length of the linear array;

at least one light pipe disposed adjacent to the plurality of LEDs;

an optical sheet disposed adjacent the at least one light pipe, wherein the optical sheet comprises a plurality of light modifying elements aligned perpendicular to the array, wherein the light modifying elements comprise a lenticular sheet wherein one side of the lenticular sheet has at least one lens and an opposite side of the lenticular sheet is substantially flat; and a controller operatively coupled to the first LEDs and the second LEDs, wherein the controller is configured to perform:

a first illumination function by illuminating only the first LEDs to produce sufficient light output for performing an automotive signaling function; and a second illumination function by illuminating both the first LEDs and the second LEDs to produce sufficient light output for performing a daytime running light function.

2. The light assembly of claim 1, wherein a plurality of lenticular sheets are layered to modify light from the first and second pluralities of LEDs.

3. The light assembly of claim 1, wherein the light modifying elements are configured for diffusing light along a longitudinal direction of the light pipe for smoothing light from the first LEDs and the second LEDs.

4. The light assembly of claim 1, wherein the array is a linear array and the first LEDs and the second LEDs alternate along the length of the linear array.

5. The light assembly of claim 1, wherein the array is a multi-linear matrix and the first LEDs and the second LEDs alternate along the length of the multi-linear matrix.

6. The light assembly of claim 5, wherein the first LEDs and the second LEDs are arranged in an alternating pattern with up to four of the LEDs of the first or second color being directly adjacent to one another.

7. The light assembly of claim 6, wherein the alternating pattern is repeated along the length of the multi-linear matrix.

8. The light assembly of claim 1, wherein the first LEDs are white colored LEDs, and the second LEDs are amber colored LEDs.

9. The light assembly of claim 1, wherein a curvilinear light pipe aligns with a curvilinear array of LEDs.

10. A vehicular lighting method, the method comprising:

illuminating a plurality of first color LEDs via a controller;

illuminating the first color LEDs and a plurality of second color LEDs via the controller;

modifying light emitted from the first color LEDs and the second color LEDs via at least one light pipe disposed adjacent to the first and second color LEDs;

diffusing light emitted from the at least one light pipe via an optical sheet disposed adjacent to the at least one light pipe, wherein light modifying elements of the optical sheet are aligned perpendicular to the plurality of LEDs, and the light modifying elements comprise a lenticular sheet wherein one side of the lenticular sheet has at least one lens and an opposite side of the lenticular sheet is substantially flat;

blending light from the first color LEDs with the second color LEDs to produce sufficient light output for performing a daytime running light function; and blending light from only the second color LEDs, while the first color LEDs are turned off, to produce sufficient light output for performing an automotive signaling function.

11. The method of claim 10, comprising diffusing light via the light modifying elements along a longitudinal direction of the light pipe, thereby smoothing light from the first color LEDs and the second color LEDs.

* * * * *